US008713930B2

(12) United States Patent
Cheong

(10) Patent No.: US 8,713,930 B2
(45) Date of Patent: May 6, 2014

(54) NEGATIVE CONTROL TYPE HYDRAULIC SYSTEM

(75) Inventor: Hae Kyun Cheong, Busan (KR)

(73) Assignee: Volvo Construction Equipment Holding Sweden AB, Eskilstuna (SE)

(*) Notice: Subject to any disclaimer, the term of this patent is extended or adjusted under 35 U.S.C. 154(b) by 632 days.

(21) Appl. No.: 12/980,530

(22) Filed: Dec. 29, 2010

(65) Prior Publication Data

US 2011/0158830 A1 Jun. 30, 2011

(30) Foreign Application Priority Data

Dec. 29, 2009 (KR) ........................ 10-2009-0132677

(51) Int. Cl.
*F16D 31/02* (2006.01)

(52) U.S. Cl.
USPC ................................................ 60/452; 60/459

(58) Field of Classification Search
USPC .................... 60/420, 422, 451, 452, 462, 459
See application file for complete search history.

(56) References Cited

U.S. PATENT DOCUMENTS 3,620,129 A * 11/1971 Fruehauf ......................... 91/449
4,509,406 A * 4/1985 Melocik .......................... 91/453
4,730,543 A * 3/1988 Holmes ........................... 91/448
4,898,078 A * 2/1990 Gage et al. ....................... 91/524
5,489,005 A * 2/1996 Marcott et al. ................ 180/418
H1953 H * 4/2001 Burckhartzmeyer et al. ... 60/403
6,560,962 B2 * 5/2003 Sawada et al. .................. 60/452
6,679,281 B1 * 1/2004 Thiry et al. .............. 137/118.06
6,772,590 B2 * 8/2004 Tsuruga et al. ................. 60/468
7,124,578 B2 * 10/2006 Noel ............................... 60/468
7,407,034 B2 * 8/2008 Vigholm ....................... 180/422
7,610,989 B2 * 11/2009 Vigholm et al. .............. 180/418
2009/0094973 A1 * 4/2009 Cheong ........................... 60/422

FOREIGN PATENT DOCUMENTS

EP 2 022 989 A1 2/2009
JP 6-33905 A 2/1994
JP 7-133806 A 5/1995

OTHER PUBLICATIONS

Partial European Search dated Apr. 4, 2011 from the EPO for European Application No. 10197176.0-2316.
Espacenet English abstract of JP 6-33905 A, Date: 1994.
Espacenet English abstract of JP 7-133806 A, Date: 1995.

* cited by examiner

*Primary Examiner* — Edward Look
*Assistant Examiner* — Michael Quandt
(74) *Attorney, Agent, or Firm* — Ladas & Parry LLP

(57) ABSTRACT

A negative control type hydraulic system in which the use of a pilot pump and a load pressure generator between a hydraulic pump and a control valve is not required to prevent a power loss.

4 Claims, 5 Drawing Sheets

NEGATIVE CONTROL TYPE HYDRAULIC SYSTEM

CROSS-REFERENCE TO RELATED APPLICATION

This application is based on and claims priority from Korean Patent Application No. 10-2009-132677, filed on Dec. 29, 2009 in the Korean Intellectual Property Office, the disclosure of which is incorporated herein in its entirety by reference.

BACKGROUND OF THE INVENTION

1. Field of the Invention

The present invention relates to a hydraulic system which controls the discharge flow rate of a variable-displacement hydraulic pump by a negative control system, and more particularly to a negative control type hydraulic system, in which the use of a pilot pump is not required to prevent a power loss and also the use of a load pressure generator between a hydraulic pump and a control valve is not required.

The negative control system is a control system which decreases the discharge flow rate of a hydraulic pump if pilot signal pressure generated by a pilot signal pressure generation means that is installed on the downstream side of a center bypass line of the hydraulic pump is high, and increases the discharge flow rate of the hydraulic pump if the pilot signal pressure is low.

2. Description of the Prior Art

As illustrated in FIG. 1, a negative control type hydraulic system in the related art includes a variable-displacement hydraulic pump (hereinafter referred to as a “hydraulic pump”) 2 and a fixed-displacement hydraulic pump (hereinafter referred to as a “pilot pump”) 3 connected to an engine 1; hydraulic actuators (e.g. a traveling motor 10, a bucket cylinder 11, and a boom cylinder 12) connected to switching valves 6, 7, and 8 installed on a center bypass line 5 of the hydraulic pump 2 to be driven by hydraulic fluid supplied through a parallel line 9 during switching of the respective switching valves 6, 7, and 8; pilot signal pressure generation means 13 and 14 installed on the downstream side of the center bypass line 5 to generate signal pressure for controlling the discharge flow rate of the hydraulic pump 2 by a negative control system; a control lever (RCV lever) 15 connected to the pilot pump 3 to generate secondary signal pressure in proportion to a manipulation amount; and an accumulator 16 installed on a pilot line between the pilot pump 3 and the control lever 15.

In the negative control type hydraulic system as constructed above in the related art, the hydraulic fluid discharged from the hydraulic pump 2 connected to the engine 1 is supplied to input ports of the switching valves 6, 7, and 8 through the center bypass line 5 and the parallel line 9.

If no signal pressure is supplied from the control lever 15 and spools of the switching valves 6, 7, and 8 are kept in a neutral state, the hydraulic fluid, which has passed through the center bypass line 5, is returned to a hydraulic tank T via an orifice 13 and a return line 17.

In this case, if a large amount of hydraulic fluid passes through the orifice 13, the pressure of a hydraulic pump control signal line 18 is heightened due to high resistance of the hydraulic fluid passing through the orifice 13. In this case, if the pressure exceeds a preset pressure, the hydraulic fluid is returned to the hydraulic tank T via the relief valve 14 and the return line 17.

On the other hand, since the hydraulic pump 2 is controlled by the negative control system, the discharge flow rate is decreased if the pressure of the hydraulic pump control signal line 18 is heightened, while the discharge flow rate is increased if the pressure of the hydraulic pump control signal line 18 is lowered.

Also, in the case where the switching valves 6, 7, and 8 are switched, the sectional area of the center bypass line 5 is reduced by the switching valves 6, 7, and 8 to reduce the flow rate, and thus the resistance of the hydraulic fluid passing through the orifice 13 is lowered to increase the discharge flow rate of the hydraulic pump 2.

On the other hand, a part of the pilot hydraulic fluid discharged from the pilot pump 3 is stored in the accumulator 16, while another part of the pilot hydraulic fluid is supplied to the switching valves 6, 7, and 8 via the control lever 15 as the signal pressure for switching the switching valves 6, 7, and 8.

In this case, if the pressure of the pilot pump side 3 is lower than the pressure stored in the accumulator 16, a backward flow is prevented by a check value 19 installed in the pilot line. That is, if the engine 1 is stopped and the pressure on the pilot pump side 3 is instantaneously lowered, the hydraulic fluid stored in the accumulator 16 may be used as the pilot signal pressure for emergency.

On the other hand, if the control lever 15 is kept in a neutral position, the pilot hydraulic fluid that is discharged from the pilot pump 3 is blocked. The set pressure of the pilot hydraulic fluid is kept by a relief valve 20 installed in a line that is branched from the pilot line 25, and if the pressure of the pilot hydraulic fluid exceeds the set pressure, the pilot hydraulic fluid is returned to the hydraulic tank T through the relief value 20.

If the spool of the switching valve 8 is shifted in the right direction as shown in the drawing by the pilot signal pressure that is supplied in accordance with the manipulation of the control lever 15, the hydraulic fluid from the hydraulic pump 2 is supplied to a large chamber **12*a* of the boom cylinder via the parallel line 9 and the switching valve 8 to make the boom cylinder expand. In this case, the hydraulic fluid in a small chamber 12*b* of the boom cylinder is returned to the hydraulic tank T via the switching valve 8, a return line 8*a* of the switching valve, and the return line 17**.

By contrast, if the spool of the switching valve 8 is shifted in the left direction as shown in the drawing by the manipulation of the control lever 15, the hydraulic fluid from the hydraulic pump 2 is supplied to the small chamber **12*b* of the boom cylinder via the parallel line 9 and the switching valve 8 to make the boom cylinder contract. In this case, the hydraulic fluid in the large chamber 12*a* of the boom cylinder is returned to the hydraulic tank T via the switching valve 8, a return line 8*b* of the switching valve, and the return line 17**.

On the other hand, if load is applied to the hydraulic actuator 12 by a weight body, the boom cylinder contracts by its own weight. In this case, if the amount of hydraulic fluid flowing into the small chamber **12*b* is smaller than the amount of hydraulic fluid flowing out from the large chamber 12*a*, the pressure of the return line 8*a* of the switching valve 8 is increased by the force of a back pressure check spring 22 that acts on a check valve 21 installed in the return line 8*a* of the switching valve 8, and this prevents a negative pressure from occurring in the small chamber 12*b*** of the boom cylinder.

That is, if the pressure of the return line **8*a* becomes higher than the pressure of the small chamber 12*b*, the hydraulic fluid that is returned to the boom cylinder through a recycle check value 24** installed in a recycle line can be recycled.

On the other hand, the pilot pump 3 connected to the engine 1 always discharges a constant amount of hydraulic fluid in accordance with the rotation of the engine 1. That is, the hydraulic fluid discharged from the pilot pump 3 is used as the signal pressure for shifting the switching valves 6, 7, and 8 when the control lever 15 is shifted, and the other hydraulic fluid is returned to the hydraulic tank T through the relief valve 20 to cause a power loss as follows.

Power loss=(the set pressure of the relief valve 20)×(relieved discharge flow rate)

Also, since a separate pilot pump 3 is constructed by the engine 1, the manufacturing cost is increased and the structure of the hydraulic system is complicated due to the increase of the number of components.

As illustrated in FIG. 2, another hydraulic system in the related art includes a hydraulic pump 30; a hydraulic actuator 31 connected to the hydraulic pump 30; a control valve 32 installed in a line between the hydraulic pump 30 and the hydraulic actuator 31 to control a start, a stop, and a direction change of the hydraulic actuator 31; a control lever shifting the control valve 32 or the like by generating secondary signal pressure in proportion to the manipulation amount; and a load pressure generation device 34 installed in a line between the hydraulic pump 30 and the control valve 32.

According to the hydraulic system as constructed above in the related art, a pilot pump for discharging pilot signal pressure to shift the control valve 32 is not separately used, but the hydraulic fluid that is discharged from the hydraulic pump 30 when the control lever 33 is manipulated is used as the pilot signal pressure. In this case, since the pilot pump for shifting the control valve 32 or the like is not used, the number of components can be reduced.

However, the load pressure generation device 34 is installed in the line between the hydraulic pump 30 and the control valve 32, and this causes an unnecessary power loss.

SUMMARY OF THE INVENTION

Accordingly, the present invention has been made to solve the above-mentioned problems occurring in the prior art while advantages achieved by the prior art are maintained intact.

An embodiment of the present invention is related to a negative control type hydraulic system, which does not require the use of a pilot pump to reduce the number of components and the manufacturing cost and thus can prevent an unnecessary power loss occurring due to the use of the pilot lamp.

An embodiment of the present invention is related to a negative control type hydraulic system, which does not require the use of a load pressure generation device between a hydraulic pump and a control valve and thus can prevent an unnecessary power loss.

In a first embodiment of the present invention, there is provided a negative control type hydraulic system, which includes an engine; at least one variable-displacement hydraulic pump connected to the engine; at least one hydraulic actuator connected to the hydraulic pump; switching valves installed in a center bypass line of the hydraulic pump and shifted, in accordance with the supply of signal pressure from the outside, to control a flow of hydraulic fluid supplied to the hydraulic actuator; pilot signal pressure generation means installed on a downstream side of the center bypass line to generate signal pressure for variably controlling a discharge flow rate of the hydraulic pump; a control lever outputting signal pressure in proportion to a manipulation amount; and a pressure reducing valve installed in a pilot line having one end that is branched and connected to the center bypass line and the other end that is connected to an input port of the control lever, and controlling hydraulic fluid supplied through the pilot line when the control lever is manipulated so that the hydraulic fluid from the hydraulic pump can be used as the signal pressure in accordance with the manipulation of the control lever.

In a second embodiment of the present invention, there is provided a negative control type hydraulic system, which includes an engine; at least one variable-displacement hydraulic pump connected to the engine; at least one hydraulic actuator connected to the hydraulic pump; switching valves installed in a center bypass line of the hydraulic pump and shifted, in accordance with the supply of signal pressure from the outside, to control a flow of hydraulic fluid supplied to the hydraulic actuator; pilot signal pressure generation means installed on a downstream side of the center bypass line to generate signal pressure for variably controlling a discharge flow rate of the hydraulic pump; a control lever outputting signal pressure in proportion to a manipulation amount; a shuttle valve selecting and outputting one of hydraulic fluid supplied from the hydraulic pump through a pilot line that is branched and connected to the center bypass line and return hydraulic fluid supplied through a recycle return line that is connected to a recycle valve recycling the hydraulic fluid that is returned from the hydraulic actuator; and a pressure reducing valve installed in a pilot line between the shuttle valve and the control lever, and controlling hydraulic fluid supplied from the shuttle valve when the control lever is manipulated so that the hydraulic fluid supplied through the shuttle valve can be used as the signal pressure in accordance with the manipulation of the control lever.

In a preferred embodiment of the present invention, the negative control type hydraulic system further includes a backflow prevention check valve installed in a pilot line between the pressure reducing valve and the control lever to prevent a backflow of the hydraulic fluid when a pressure of the hydraulic fluid on the hydraulic pump side is lower than a preset pressure.

In a preferred embodiment of the present invention, the negative control type hydraulic system further includes an accumulator installed in a pilot line between the backflow prevention check valve and the control lever to use the stored hydraulic fluid as the signal pressure of the control lever when the pressure of the hydraulic fluid on the hydraulic pump side is lower than the preset pressure.

The negative control type hydraulic system as constructed above according to the embodiments of the present invention has the following advantages.

In the negative control type hydraulic system, since the hydraulic fluid from the variable-displacement hydraulic pump is used as the pilot signal pressure, the pilot pump is unnecessary, the manufacturing cost is reduced, and an unnecessary power loss due to the use of the pilot pump is prevented.

Also, since the use of the load pressure generation device between the hydraulic pump and the control valve is unnecessary, a power loss due to the use of the load pressure generation unit is prevented.

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENTS

Hereinafter, preferred embodiments of the present invention will be described with reference to the accompanying drawings. The matters defined in the description, such as the detailed construction and elements, are nothing but specific details provided to assist those of ordinary skill in the art in a comprehensive understanding of the invention, and thus the present invention is not limited thereto.

Figure 3:
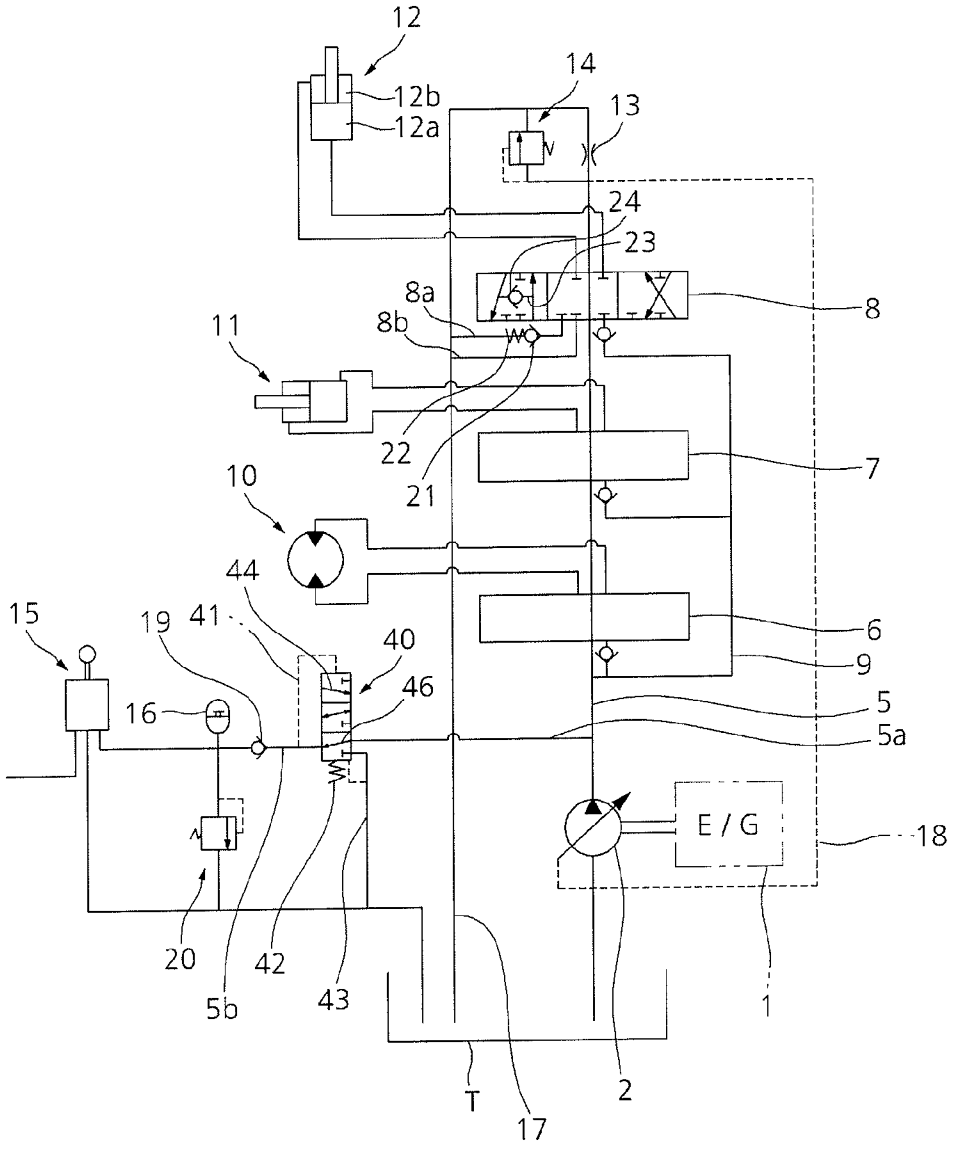
FIG. 3 is a hydraulic circuit diagram of a negative control type hydraulic system according to a first embodiment of the present invention.

As illustrated in FIG. 3, a negative control type hydraulic system according to the first embodiment of the present invention includes a negative control type hydraulic system, which includes an engine 1; at least one variable-displacement hydraulic pump (hereinafter referred to as a "hydraulic pump") connected to the engine 1; at least one hydraulic actuator (e.g. a traveling motor 10, a bucket cylinder 11, and a boom cylinder 12) connected to the hydraulic pump 2; switching valves 6, 7, and 8 installed in a center bypass line 5 of the hydraulic pump 2 and shifted, in accordance with the supply of signal pressure from the outside, to control a flow of hydraulic fluid supplied to the hydraulic actuators 10, 11, and 12; pilot signal pressure generation means 13 and 14 installed on a downstream side of the center bypass line 5 to generate signal pressure for variably controlling a discharge flow rate of the hydraulic pump 2 by a negative control system; a control lever 15 outputting signal pressure in proportion to a user's manipulation amount; and a pressure reducing valve 40 installed in a pilot line 5*a* having one end that is branched and connected to the center bypass line 5 and the other end that is connected to an input port of the control lever 15, and controlling hydraulic fluid supplied through the pilot line 5*a* when the control lever 15 is manipulated so that the hydraulic fluid from the hydraulic pump 2 can be used as the signal pressure in accordance with the manipulation of the control lever 15.

The negative control type hydraulic system according to an embodiment of the present invention further includes a backflow prevention check valve 19 installed in a pilot line 5*b* between the pressure reducing valve 40 and the control lever 15 to prevent a backflow of the hydraulic fluid when a pressure of the hydraulic fluid on the hydraulic pump side 2 is lower than a preset pressure (which means the pressure of hydraulic fluid stored in an accumulator 16).

The negative control type hydraulic system according to an embodiment of the present invention further includes the accumulator 16 installed in a pilot line 5*b* between the backflow prevention check valve 19 and the control lever 15 to use the stored hydraulic fluid as the signal pressure of the control lever 15 when the pressure of the hydraulic fluid on the hydraulic pump side 2 is lower than the preset pressure.

Figure 1:
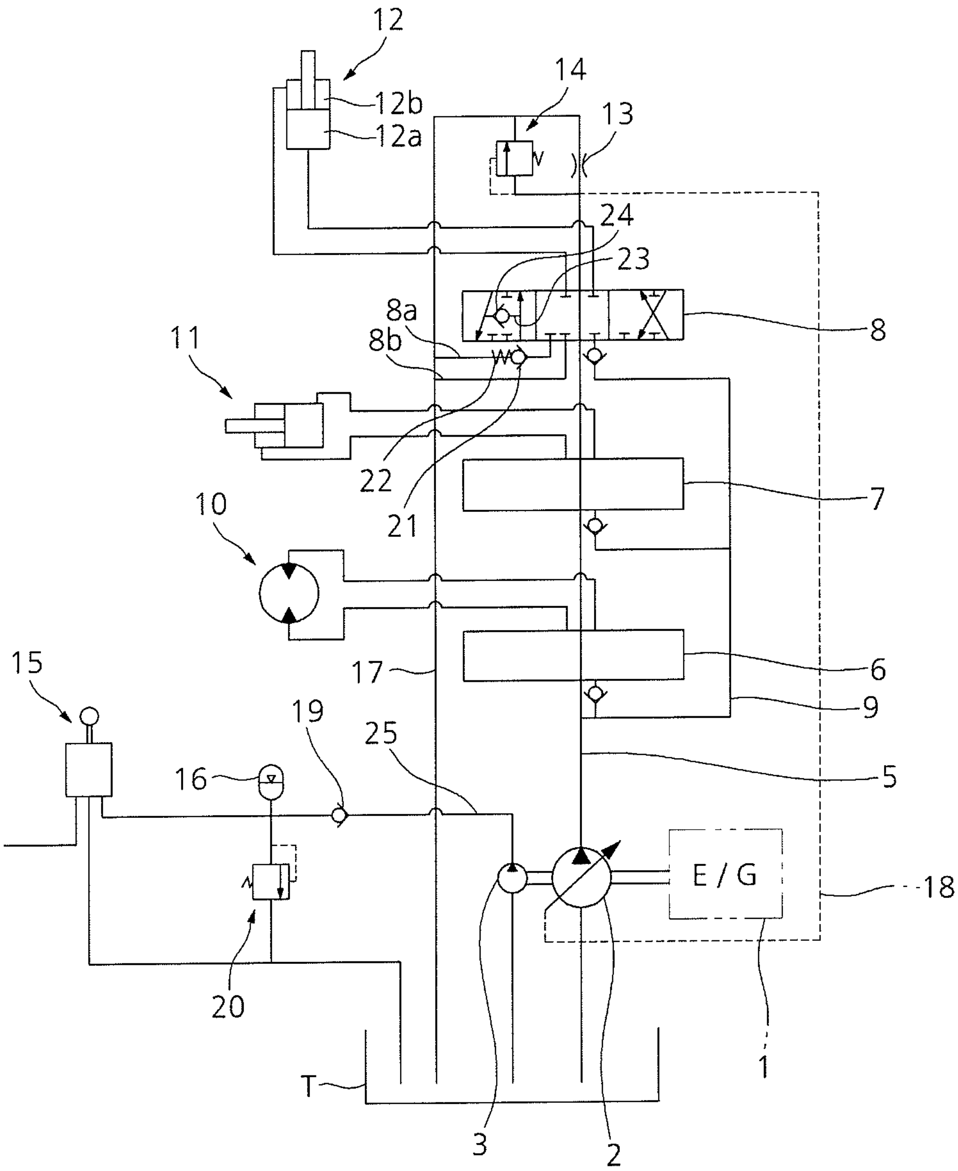
FIG. 1 PRIOR ART
FIG. 1 is a hydraulic circuit diagram of a negative control type hydraulic system in the related art.
Figure 2:
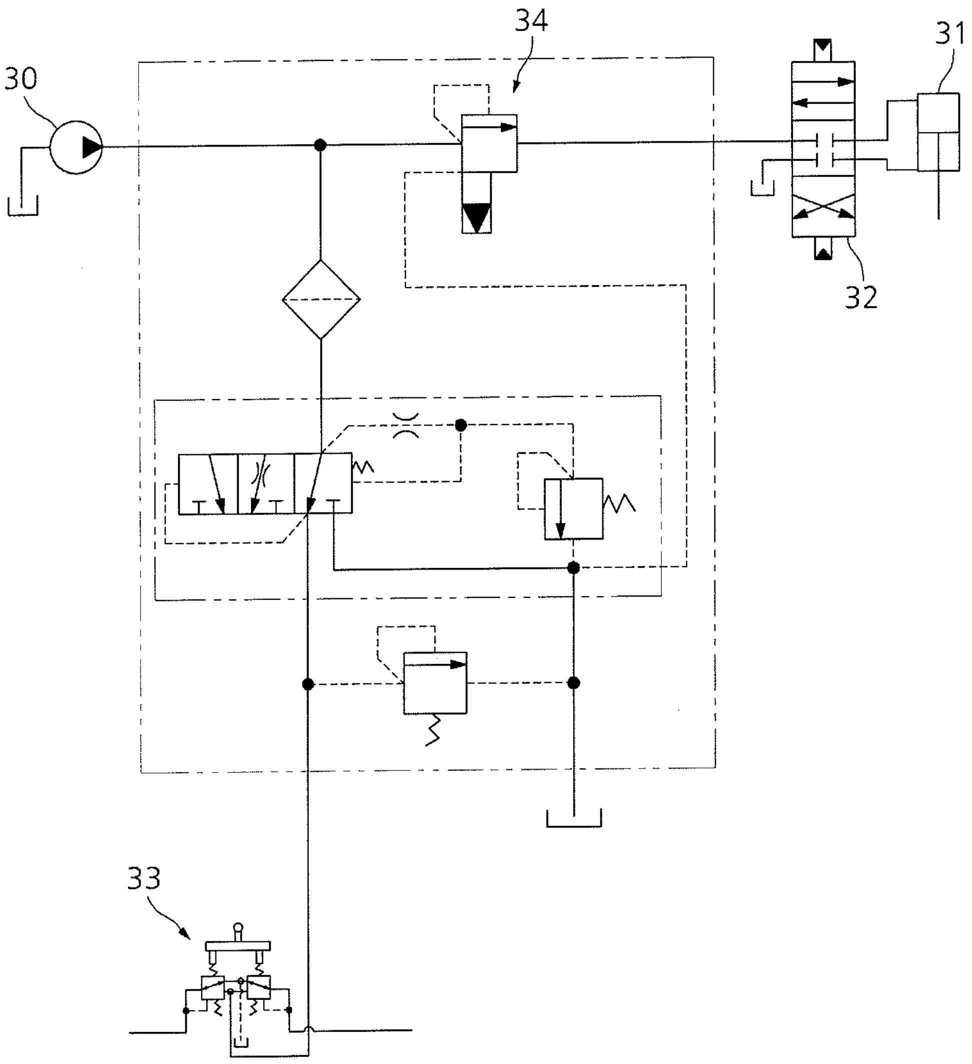
FIG. 2 PRIOR ART
FIG. 2 is another hydraulic circuit diagram in the related art.

In this case, the construction of the hydraulic system, except for the pilot line 5*a* that is branched and connected to the center bypass line 5 and the pressure reducing valve 40 installed in the pilot line 5*a* to use the hydraulic fluid discharged from the hydraulic pump 2 as the signal pressure of the control lever 15, is substantially the same as the construction of the negative control type hydraulic system as illustrated in FIG. 1, and thus the detailed description of the construction and the operation thereof will be omitted. The same reference numerals are used for the same elements across the figures.

Hereinafter, the use example of a negative control type hydraulic system according to a first embodiment of the present invention will be described in detail with reference to the accompanying drawings.

As illustrated in FIG. 3, a part of hydraulic fluid discharged from the hydraulic pump 2 is supplied to the switching valves 6, 7, and 8 via the center bypass line 5, and simultaneously with this, a part of the hydraulic fluid discharged from the hydraulic pump 2 flows into an inlet side of the pressure reducing valve 40 installed in the pilot line 5*a*.

The hydraulic fluid of the pilot line 5*b* on the outlet side of the pressure reducing valve 40 is applied, as signal pressure, to a port that is opposite to a valve spring 42 through a signal line 41, and blocks the connection between the inlet and the outlet of the pressure reducing valve 40.

If a preset elastic force of the valve spring 42 is higher than the signal pressure generated by the signal line 41, the inlet and the outlet of the pressure reducing valve 40 are connected by a connection line 46 of the pressure reducing valve 40.

Also, if the pressure of the hydraulic fluid of the pilot line 5*a* on the outlet side of the pressure reducing valve 40 is higher than the elastic force of the valve spring 42, the hydraulic fluid of the pilot line 5*b* on the outlet side of the pressure reducing valve 40 is connected to a drain line 43 of the pressure reducing valve 40 through a connection line 44 of the pressure reducing valve 40.

That is, the preset pressure of the pressure reducing valve 40 is controlled by a difference between the signal pressure of the pilot line 5*b* on the outlet side and the elastic force of the valve spring 42.

Also, if high pressure that exceeds the preset pressure is generated in the pilot line 5*b* on the outlet side of the pressure reducing valve 40, the hydraulic fluid drains to the hydraulic tank T through a relief valve 20, and thus the high pressure generation can be prevented.

In this case, the preset pressure of the relief valve 20 is set to be relatively higher than the preset pressure of the pressure reducing valve 40, and if the high pressure that exceeds the preset pressure is not generated in the pilot line 5*b* on the outlet side of the pressure reducing valve 20, the hydraulic fluid is prevented from draining to the hydraulic tank T through the relief valve 20.

Also, an accumulator 16 is installed in the pilot line 5*b* on the outlet side of the pressure reducing valve 40, and a part of the hydraulic fluid discharged from the hydraulic pump 2 is stored in the accumulator 16. In this case, if the engine 1 is stopped or the pressure of the hydraulic fluid on the hydraulic pump side 2 is instantaneously lower than the pressure stored in the accumulator 16, a check valve 19 installed in the pilot line 5*b* can prevent the backflow of the hydraulic fluid. Also, in an emergency state as described above, the hydraulic fluid stored in the accumulator 16 can be used as the pilot signal pressure of the control lever 15.

If the control lever 15 is kept in a neutral position, the discharge flow rate of the pressure reducing valve 40 is blocked, and if the control lever 15 is manipulated, the signal pressure that is generated in proportion to the manipulation force is supplied to the switching valves 6, 7, and 8 to shift their spools.

As described above, if the switching valves 6, 7, and 8 are kept in a neutral state due to the control lever 15 that is in the neutral state, the hydraulic fluid discharged from the hydraulic pump 2 passes through an orifice 13 installed on the downstream side of the center bypass line 5. In this case, if a large amount of hydraulic fluid passes through the orifice 13, the pressure is increased, and thus the hydraulic fluid is discharged from the hydraulic pump 2 at the minimum flow rate.

Figure 5:
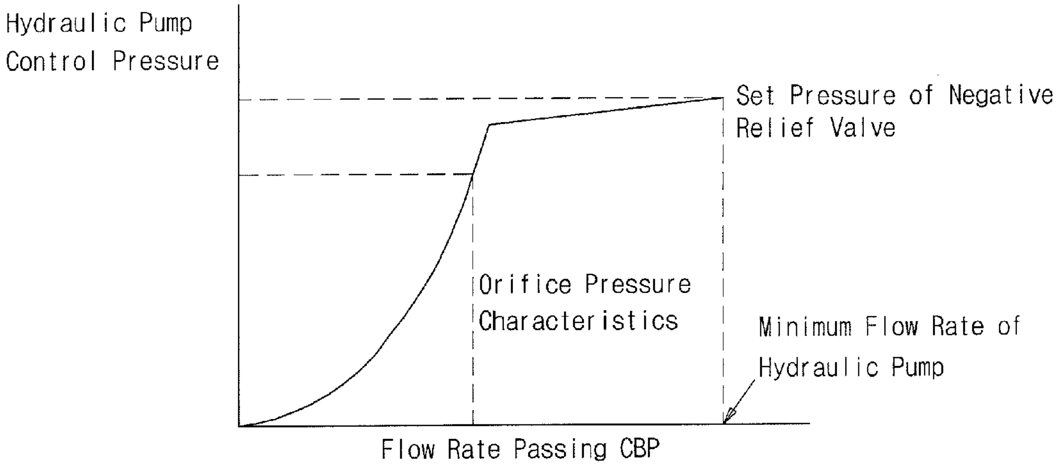
FIG. 5 is a graph explaining the negative orifice characteristic and the characteristic of a negative relief valve.

As illustrated in FIG. 5, the sectional area of the orifice 13 is set to be greater than the set pressure of a negative relief valve 14 at a flow rate that is lower than the minimum discharge flow rate of the hydraulic pump 2. Also, the set pressure of the negative relief valve 14 is set to a required pressure level of the control lever 15, and is used as the pilot signal pressure of the control lever 15.

Figure 4:
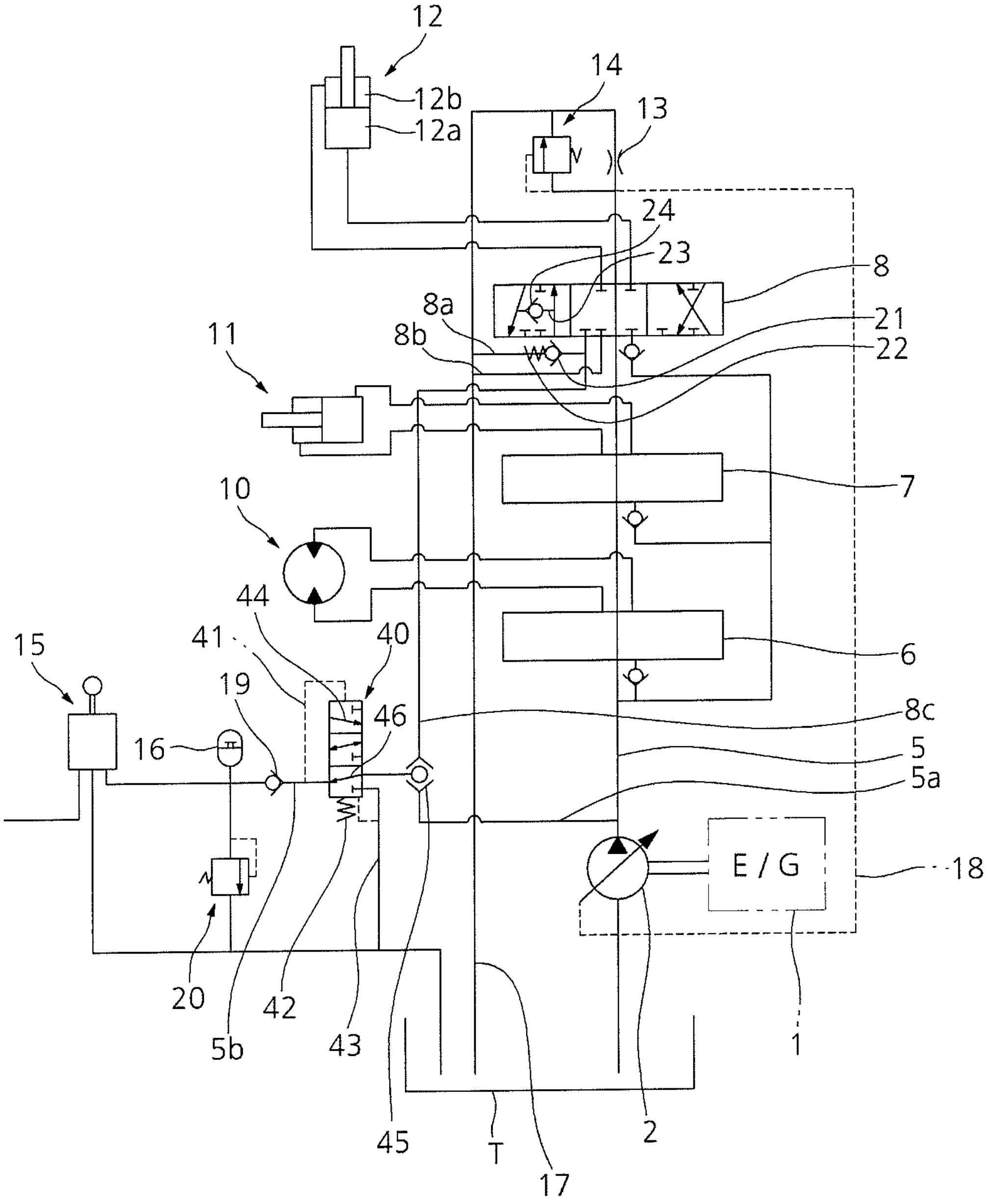
FIG. 4 is a hydraulic circuit diagram of a negative control type hydraulic system according to a second embodiment of the present invention.

As illustrated in FIG. 4, a negative control type hydraulic system according to a second embodiment of the present invention includes an engine 1; at least one variable-displacement hydraulic pump (hereinafter referred to as a "hydraulic pump") connected to the engine 1; at least one hydraulic actuator (e.g. a traveling motor 10, a bucket cylinder 11, and a boom cylinder 12) connected to the hydraulic pump 2; switching valves 6, 7, and 8 installed in a center bypass line 5 of the hydraulic pump 2 and shifted, in accordance with the supply of signal pressure from the outside, to control a flow of hydraulic fluid supplied to the hydraulic actuators 10, 11, and 12; pilot signal pressure generation means 13 and 14 installed on a downstream side of the center bypass line 5 to generate signal pressure for variably controlling a discharge flow rate of the hydraulic pump 2; a control lever 15 outputting signal pressure in proportion to a manipulation amount; a shuttle valve 45 selecting and outputting one of hydraulic fluid supplied from the hydraulic pump 2 through a pilot line 5*a* that is branched and connected to the center bypass line 5 and return hydraulic fluid supplied through a recycle return line 8*c* that is connected to a recycle valve 24 (i.e. a recycle check valve installed in a recycle line 23) recycling the hydraulic fluid that is returned from the hydraulic actuator 12; and a pressure reducing valve 40 installed in a pilot line 5*b* between the shuttle valve 45 and the control lever 15, and controlling hydraulic fluid supplied from the shuttle valve 45 to the control lever 15 when the control lever is manipulated so that the hydraulic fluid supplied through the shuttle valve 45 can be used as the signal pressure in accordance with the manipulation of the control lever 15.

In this case, the construction of the hydraulic system, except for the shuttle valve 45 that outputs a higher pressure between the hydraulic fluid supplied from the hydraulic pump 2 and the return hydraulic fluid supplied through the recycle return line 8*c* and the pressure reducing valve 40, is substantially the same as the construction of the negative control type hydraulic system as illustrated in FIG. 3, and thus the detailed description of the construction and the operation thereof will be omitted. The same reference numerals are used for the same elements across the figures.

Hereinafter, the use example of a negative control type hydraulic system according to a second embodiment of the present invention will be described in detail with reference to the accompanying drawings.

As illustrated in FIG. 4, if the load of a weight body is applied to the hydraulic actuator 12, the boom cylinder contracts by its own weight, and according to circumstances, the amount of hydraulic fluid flowing into a small chamber of the boom cylinder becomes smaller than the amount of hydraulic fluid flowing out from a large chamber. Accordingly, negative pressure is generated in the small chamber of the boom cylinder, and thus it is inappropriate to use the hydraulic fluid discharged from the hydraulic pump as the signal pressure of the control lever.

In this case, by setting the set pressure of the recycle valve 24 installed in the spool of the switching valve 8 to a level that is higher than the required pressure of the control lever 15, the hydraulic fluid that is generated in the recycle return line 8*c* is supplied to the control lever 15 via the shuttle valve 45 and the pressure reducing valve when the control lever 15 is manipulated, and thus the hydraulic fluid can be used as an auxiliary signal pressure of the control lever 15.

Figure 6:
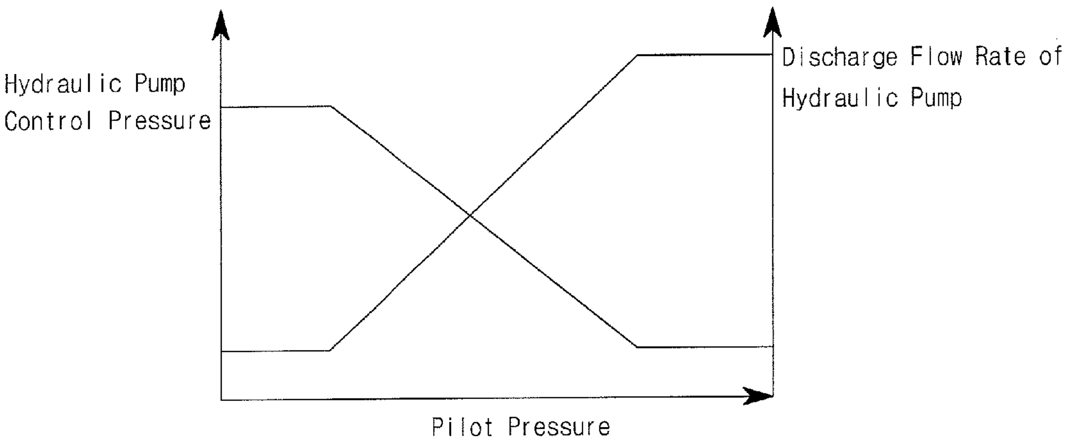
FIG. 6 is a graph explaining a negative control type hydraulic system according to the present invention.

As illustrated in FIG. 6, the negative control system according to the present invention provides a control system which decreases the discharge flow rate of the hydraulic pump 2 if pilot signal pressure generated by the pilot signal pressure generation means 13 and 14 that is installed on the downstream side of the center bypass line 5 of the hydraulic pump 2 is high, and increases the discharge flow rate of the hydraulic pump 2 if the pilot signal pressure is low.

Although preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A negative control type hydraulic system comprising:
- an engine;
- at least one variable-displacement hydraulic pump connected to the engine;
- at least one hydraulic actuator connected to the hydraulic pump;
- switching valves installed in a center bypass line of the hydraulic pump and shifted, in accordance with the supply of signal pressure from the outside, to control a flow of hydraulic fluid supplied to the hydraulic actuator;
- pilot signal pressure generation means installed on a downstream side of the center bypass line to generate signal pressure for variably controlling a discharge flow rate of the hydraulic pump;
- a control lever outputting signal pressure in proportion to a manipulation amount;
- a shuttle valve selecting and outputting one of hydraulic fluid supplied from the hydraulic pump through a pilot line that is branched and connected to the center bypass line and return hydraulic fluid supplied through a recycle return line that is connected to a recycle valve recycling the hydraulic fluid that is returned from the hydraulic actuator; and
- a pressure reducing valve installed in a pilot line between the shuttle valve and the control lever, and controlling hydraulic fluid supplied from the shuttle valve when the control lever is manipulated so that the hydraulic fluid supplied through the shuttle valve can be used as the signal pressure in accordance with the manipulation of the control lever.

2. The negative control type hydraulic system of claim 1, further comprising a backflow prevention check valve installed in a pilot line between the pressure reducing valve and the control lever to prevent a backflow of the hydraulic fluid when a pressure of the hydraulic fluid on the hydraulic pump side is lower than a preset pressure.

3. The negative control type hydraulic system of claim 2, further comprising an accumulator installed in a pilot line between the backflow prevention check valve and the control lever to use the stored hydraulic fluid as the signal pressure of the control lever when the pressure of the hydraulic fluid on the hydraulic pump side is lower than the preset pressure.

4. The negative control type hydraulic system of claim 3, wherein a set pressure of a relief valve installed in a line which is branched from the outlet side pilot line and connected to a hydraulic tank is set to be relatively higher than a set pressure of the pressure reducing valve, and if high pressure that exceeds the set pressure is not generated in the outlet side pilot line of the pressure reducing valve, the hydraulic fluid is prevented from draining to the hydraulic tank through the relief valve.

* * * * *